(12) United States Patent
Choi

(10) Patent No.: US 9,282,175 B2
(45) Date of Patent: Mar. 8, 2016

(54) MOBILE TERMINAL AND CONTROLLING METHOD THEREOF

(71) Applicant: LG ELECTRONICS INC., Seoul (KR)

(72) Inventor: Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 13/727,429

(22) Filed: Dec. 26, 2012

(65) Prior Publication Data

US 2013/0165186 A1 Jun. 27, 2013

(30) Foreign Application Priority Data

Dec. 27, 2011 (KR) ........................ 10-2011-0143083

(51) Int. Cl.
| | |
|---|---|
| *G09G 5/00* | (2006.01) |
| *H04M 1/02* | (2006.01) |
| *G02B 27/22* | (2006.01) |
| *G02B 27/26* | (2006.01) |
| *H04N 13/00* | (2006.01) |
| *H04N 13/02* | (2006.01) |

(52) U.S. Cl.
CPC ......... *H04M 1/0266* (2013.01); *G02B 27/2214* (2013.01); *G02B 27/2264* (2013.01); *G02B 27/26* (2013.01); *H04N 13/0022* (2013.01); *H04N 13/026* (2013.01)

(58) Field of Classification Search
None
See application file for complete search history.

(56) References Cited

U.S. PATENT DOCUMENTS

| | | | | |
|---|---|---|---|---|
| 2012/0038745 | A1* | 2/2012 | Yu et al. | 348/46 |
| 2012/0154377 | A1* | 6/2012 | Sato et al. | 345/419 |
| 2012/0206574 | A1* | 8/2012 | Shikata et al. | 348/46 |
| 2013/0038701 | A1* | 2/2013 | Hung et al. | 348/49 |
| 2014/0250363 | A1* | 9/2014 | Wichmann | 715/234 |

* cited by examiner

*Primary Examiner* — Xiao Wu
*Assistant Examiner* — Mohammad H Akhavannik
(74) *Attorney, Agent, or Firm* — Lee, Hong, Degerman, Kang & Waimey

(57) ABSTRACT

A mobile terminal includes a display, an input unit and a controller. The display is configured to display three-dimensional (3D) content having first and second images for viewing by a left eye and a right eye, respectively. A same object depicted in each of the first and second images includes a common point. A position of the common point in relation to the first and second images is separated by a distance based on a 3D depth of the object. The controller is configured to cause displaying of the 3D content; select the object in response to detection of a first input; and change a position of the object in at least the first or second image in response to a detection of a second input related to changing the 3D depth of the object such that the distance between the common point in the first and second images changes.

18 Claims, 18 Drawing Sheets

FIG. 18
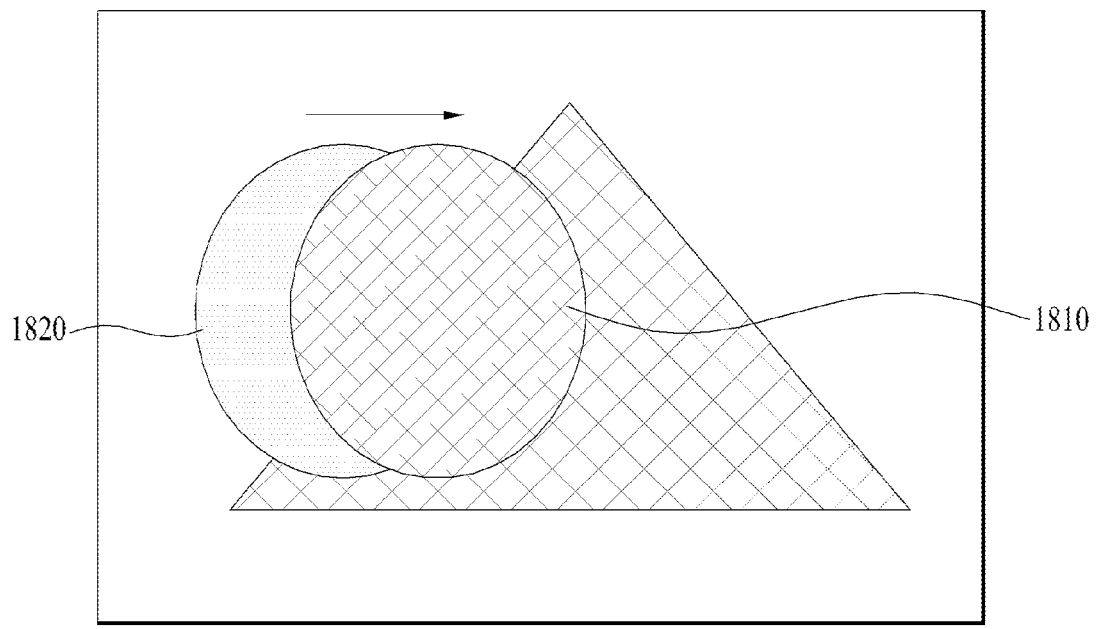
(a)
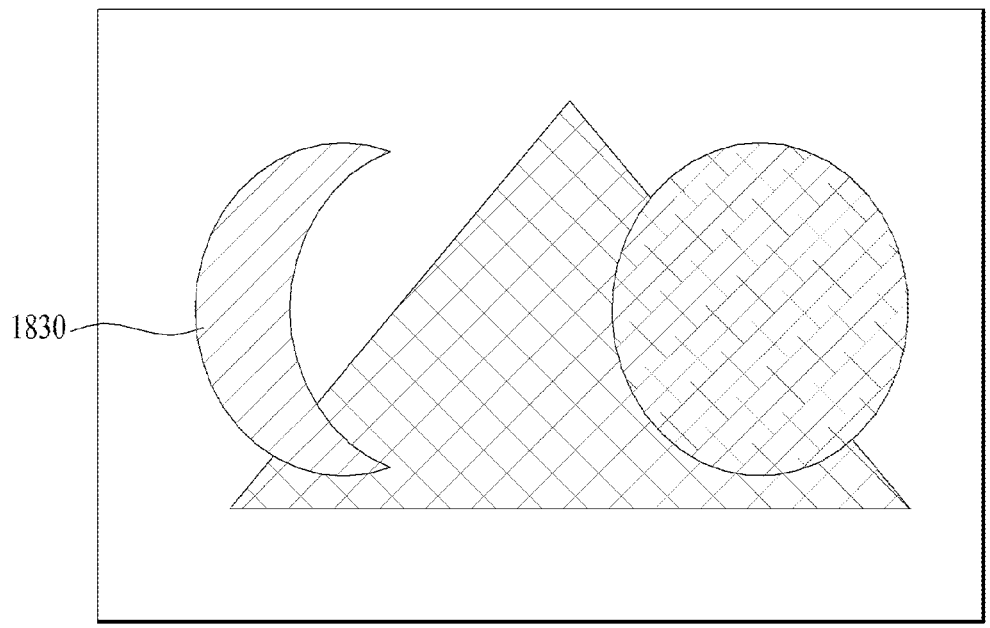
(b)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean patent Application No. 10-2011-0143083, filed on Dec. 27, 2011, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for editing an object included in a 3D stereoscopic content and a 3D depth given to the object conveniently.

2. Discussion of the Related Art

Recently, the demand for a display device of a terminal type is increasingly rising. Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and diversify the terminal functions, it may be able to consider improving structural parts and/or software parts of the terminal.

Recently, a 3D stereoscopic image of binocular disparity is implemented on a display unit of a mobile terminal and a content outputtable as a 3D stereoscopic image can be directly photographed using a plurality of cameras provided to the mobile terminal.

Therefore, the demand for a user interface capable of editing 3D contents in accordance with user's intention conveniently and freely is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and user interface for controlling the same, by which a 3D stereoscopic image can be edited more conveniently.

Another object of the present invention is to provide a mobile terminal and controlling method thereof, by which at least one of a size and 3D depth of an object included in a 3D content can be edited conveniently.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit having a binocular disparity generating means, the display unit configured to display a 3D content having a $1^{st}$ image for a left eye and a $2^{nd}$ image for a right eye in 2D or 3D, a user input unit configured to receive an input of a command from a user, and a controller, if a specific object is selected from at least one object included in the 3D content in response to a $1^{st}$ command inputted via the user input unit and a $2^{nd}$ command for changing a 3D depth of the selected object is inputted via the user input unit, detecting the selected object from each of the $1^{st}$ image and the $2^{nd}$ image, the controller changing a distance between points respectively having the selected object arranged thereat in the $1^{st}$ and $2^{nd}$ images in response to the $2^{nd}$ command.

In another aspect of the present invention, a method of controlling a mobile terminal includes the steps of displaying a 3D content having a $1^{st}$ image for a left eye and a $2^{nd}$ image for a right eye via a display unit having a binocular disparity generating means, selecting a specific object from at least one object included in the 3D content in response to a $1^{st}$ command inputted via a user input unit, if a $2^{nd}$ command for changing a 3D depth of the selected object is inputted via the user input unit, detecting the selected object from each of the $1^{st}$ image and the $2^{nd}$ image, and changing a distance between points respectively having the selected object arranged thereat in the $1^{st}$ and $2^{nd}$ images in response to the $2^{nd}$ command.

Accordingly, the present invention provides the following effects and/or advantages.

First of all, a user is able to edit and appreciate a 3D stereoscopic image more conveniently.

Secondly, a user is able to check and change a 3D depth of an object included in a 3D content conveniently and is also able to adjust a size of the object.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 18 is a diagram for one example of an image compensating method in various aspects according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

In the following detailed description, it is assumed that an image display device is a terminal. Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
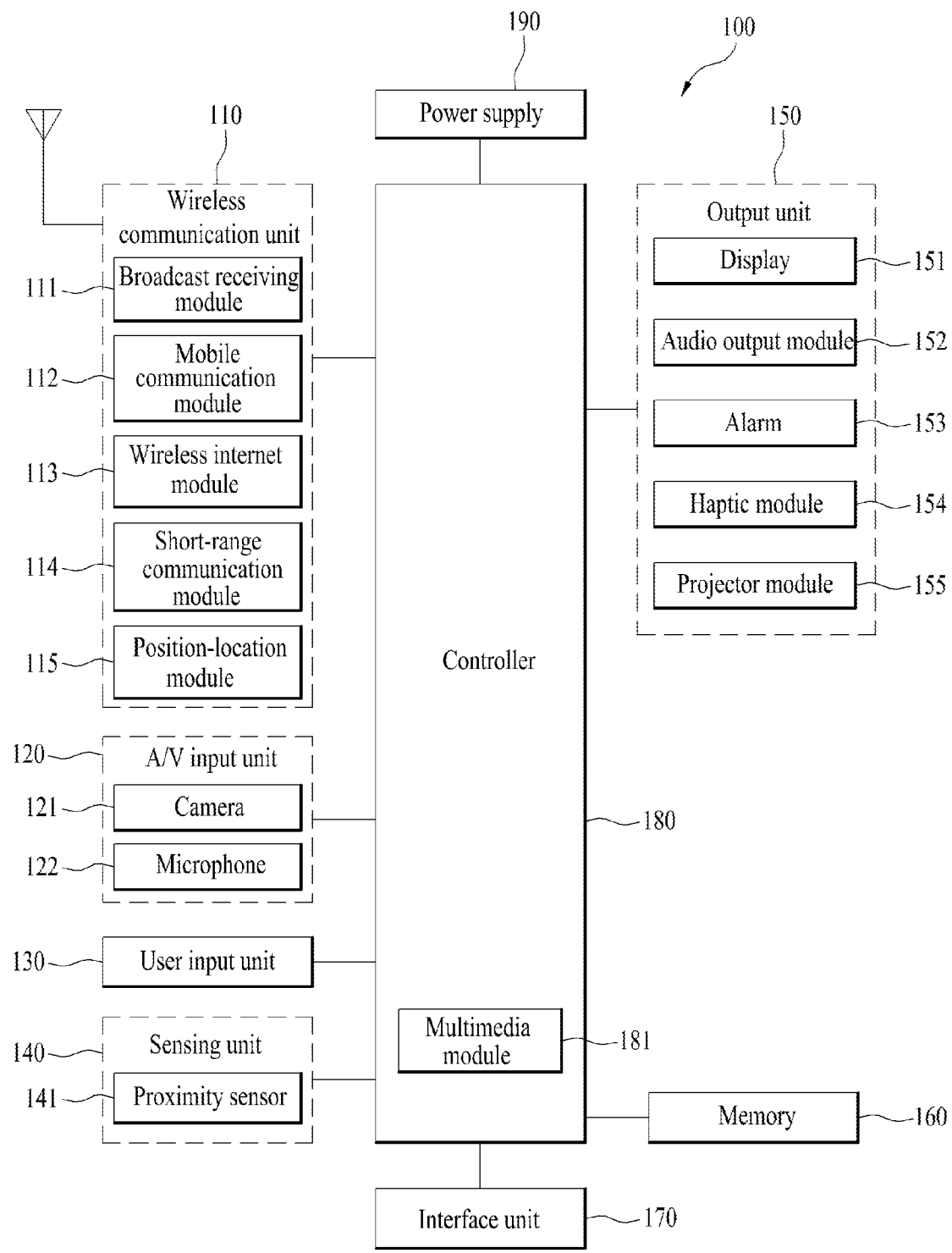
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), LTE (Long Term Evolution) and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/v input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
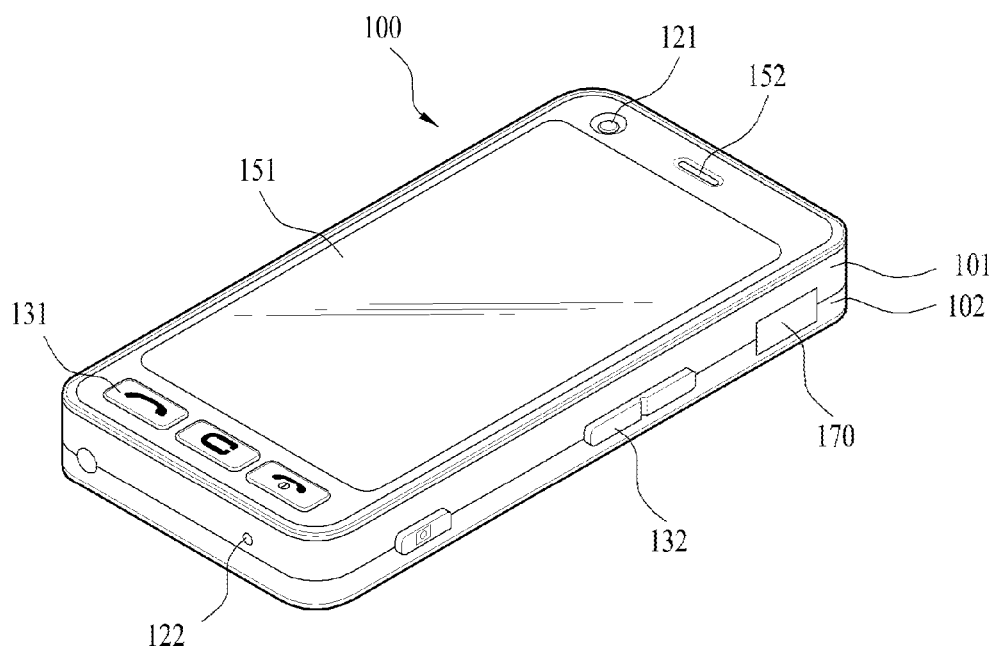
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
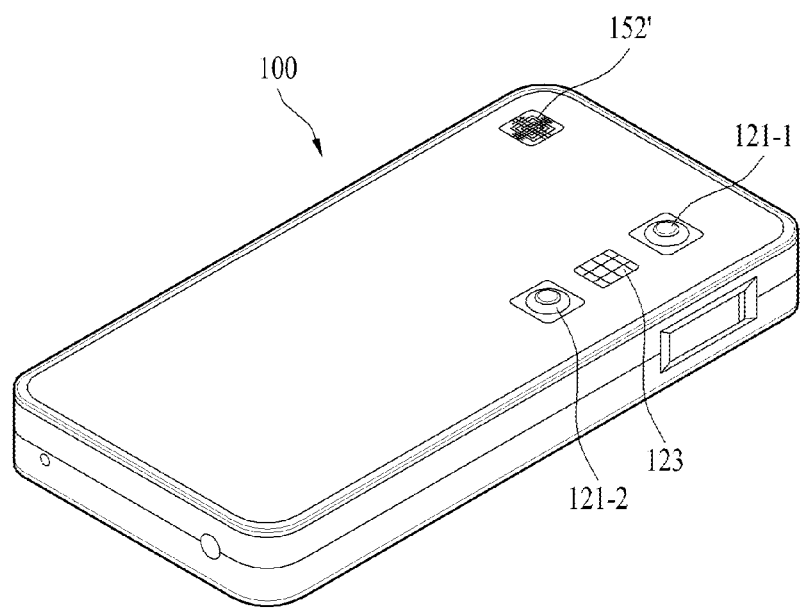
FIG. 2B is a rear perspective diagram of a mobile terminal according to one embodiment of the present invention to describe one operating status thereof.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Implementation of Stereoscopic 3D Images

In the following description, a method of displaying a 3D image in a mobile terminal applicable to embodiments of the present invention and a display unit configuration for the same are explained.

One of schemes for implementing a 3D image is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 3 as follows.

Figure 3:
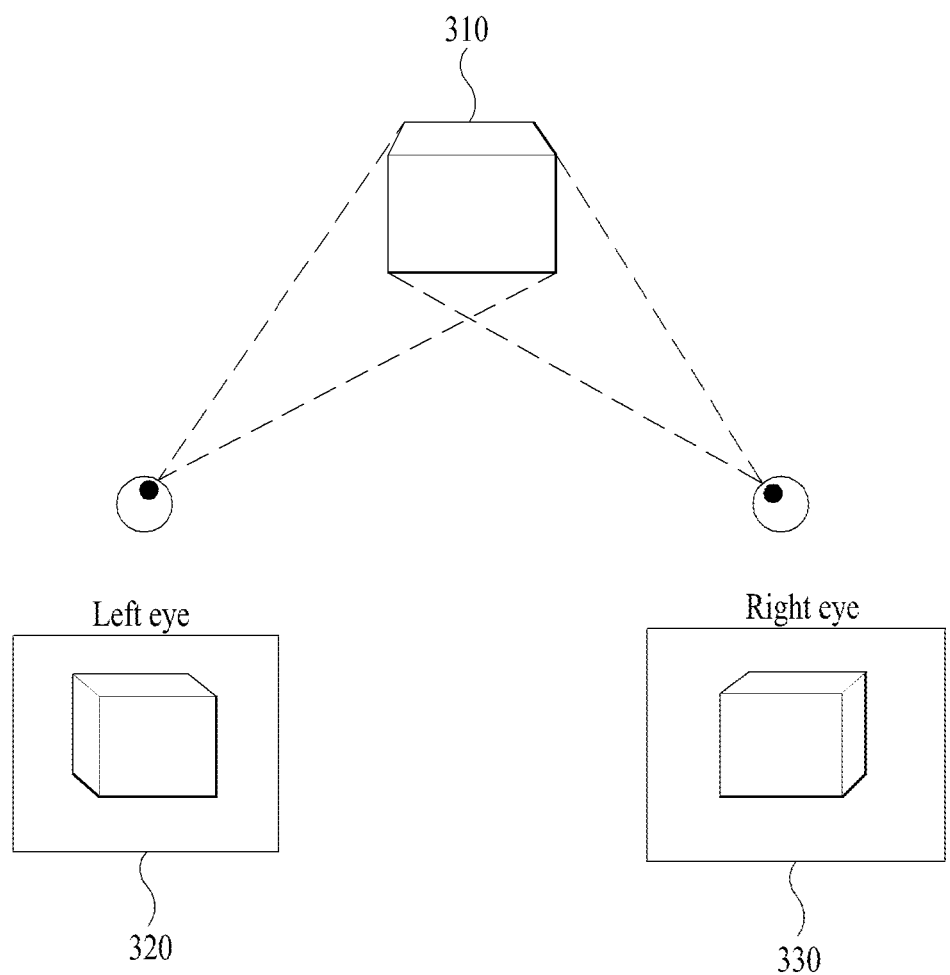
FIG. 3 is a diagram for describing the principle of binocular disparity.

FIG. 3 is a diagram for explaining the principle of binocular disparity.

Referring to FIG. 3, assume a situation that a hexahedron 310 is positioned as a subject in front below an eye's height to be seen through human eyes. In this case, a left eye is able to see a left eye planar image 320 revealing three facets including a top side, a front side and a left lateral side of the hexahedron 310 only. And, a right eye is able to see a right eye planar image 330 revealing three facets including the top side, the front side and a right lateral side of the hexahedron 310 only.

Even if a real thing is not actually positioned in front of both eyes of a user, if the left eye planar image 320 and the right eye planar image 330 are set to arrive at the left eye and the right eye, respectively, a user is able to substantially sense the hexahedron 310 as if looking at the hexahedron 310 actually.

Thus, in order to implement the 3D image belonging to the second category in the mobile terminal 100, images of the same object should arrive at both eyes in a manner of being discriminated from each other for the left and right eye images of the same object with a predetermined parallax.

In the following description, 3D depth attributed to the binocular disparity is explained with reference to FIG. 4.

Figure 4:
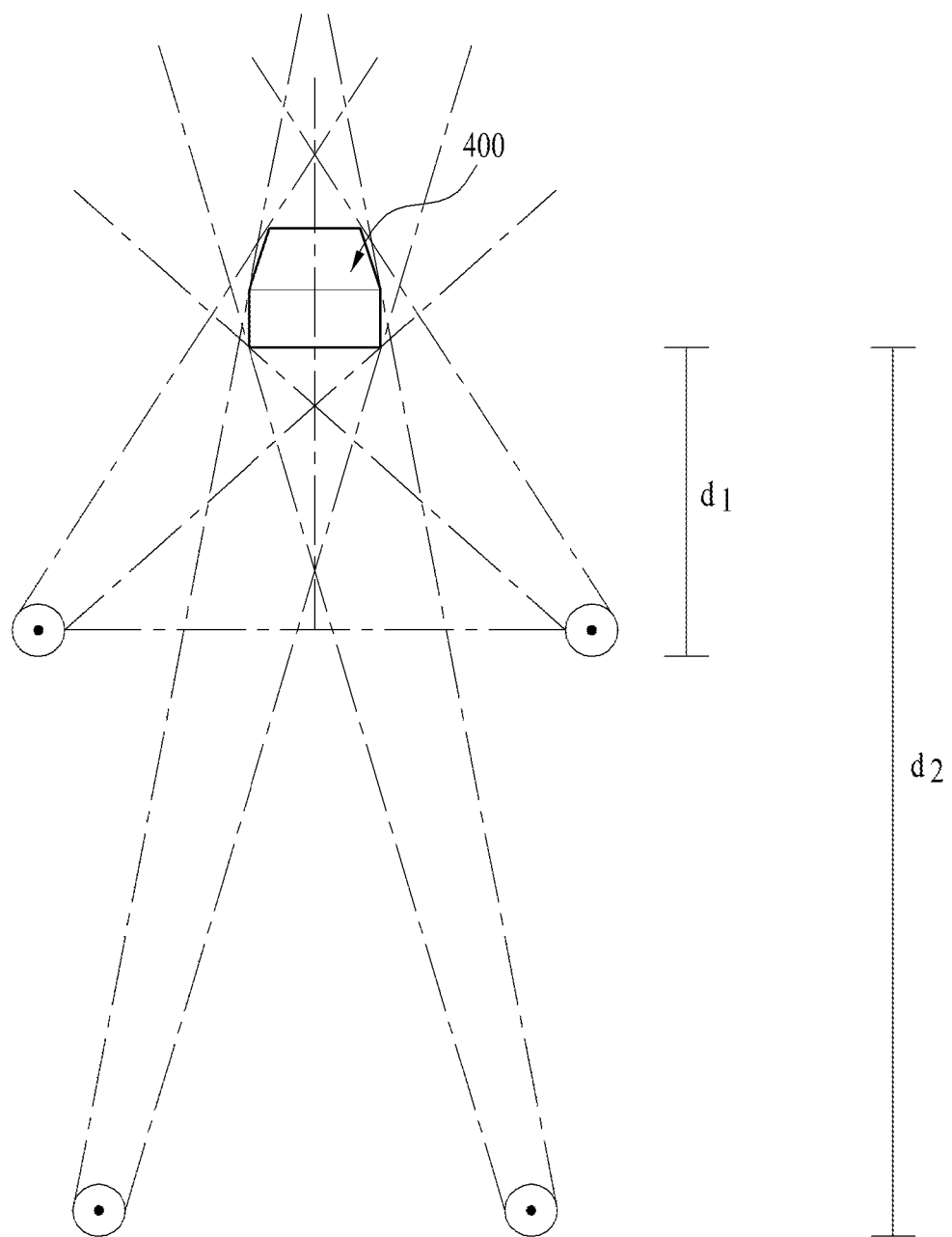
FIG. 4 is a diagram for the concept of a sense of distance and 3D depth attributed to binocular disparity.

FIG. 4 is a diagram for concept of a sense of distance and 3D depth attributed to binocular disparity.

Referring to FIG. 4, a lateral side ratio of an image entering each eyeball in view of a hexahedron 400 in a distance d1 trough both eyes is relatively higher than that in a distance d2, whereby a difference between images seen through both eyes increases. Moreover, an extent of a stereoscopic effect sensed by a user in view of the hexahedron 400 in the distance d1 can become higher than that in view of the hexahedron 400 in the distance d2. In particular, when a thing is seen through both eyes of a user, a closer subject gives a greater stereoscopic effect, whereas a farther subject gives a smaller stereoscopic effect.

Such a difference in stereoscopic effect can be digitized into a 3D depth or a 3D level. In the following description, a high stereoscopic effect of a thing situated closer shall be represented as a low 3D depth and a low 3D level. And, a low stereoscopic effect of a thing situated farther shall be represented as a high 3D depth and a high 3D level. As the definition of the 3D depth or level is relatively set, a classification reference for the 3D depth or level and an increasing/decreasing direction of the 3D depth or level is changeable.

In order to discriminate the above-mentioned two categories from each other in this disclosure, a stereoscopic image belonging to the first category shall be named '2D stereoscopic image' and a stereoscopic image belonging to the second category shall be named '3D stereoscopic image' or "perceived 3D image."

Methods of implementing a 3D stereoscopic image are described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 5 as follows.

Figure 5:
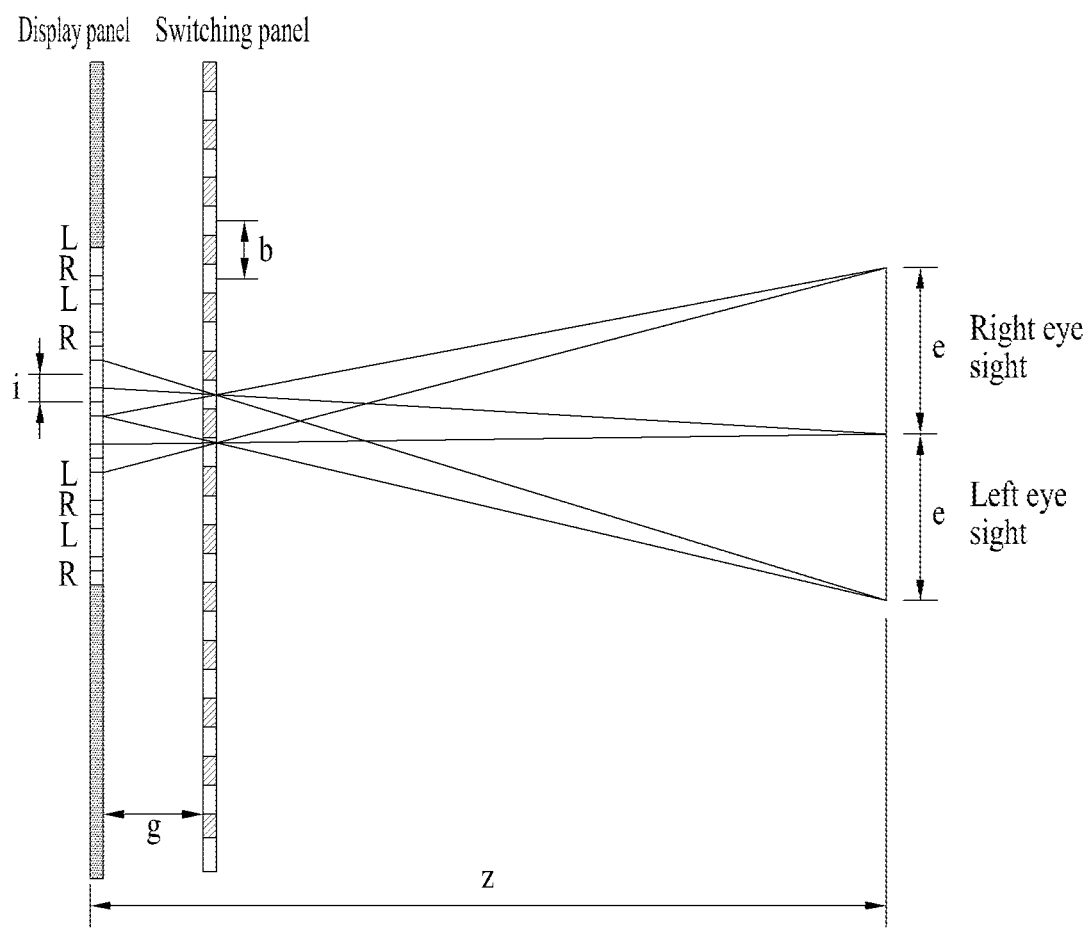
FIG. 5 is a diagram for describing the principle of a stereoscopic 3D image displaying method using binocular disparity (or parallax barrier), which is applicable to embodiments of the present invention.

FIG. 5 is a diagram for describing the principle of a 3D stereoscopic image displaying method using binocular disparity applicable to embodiments of the present invention.

Referring to FIG. 5, in order to display a 3D stereoscopic image, the display unit 151 may include a display panel and a switching panel attached to a top surface of the display panel. The switching panel is electrically controllable and is able to partially cut off or transmit lights to arrive at both eyes. In particular, the display panel may include such a general display device as LCD, LED, AMOLED and the like.

In FIG. 5, 'b' indicates a barrier space of a switching panel, 'g' indicates a gap between a switching panel and a display panel, and 'z' indicates a distance between an eye view position and a display panel. When two images are synthesized by a pixel unit (L, R), as shown in FIG. 5, the switching panel may operate in a manner that a view angle of a right eye and a view angle of a left eye correspond to a pixel included in the right image and a pixel included in the left image, respectively.

In case of attempting to output a 3D stereoscopic image, the switching panel is turned on to separate incident view angles from each other. In case of attempting to output a 2D image, the switching panel is turned off to let the incident view angle pass through. Hence, if the switching panel is turned off, binocular disparity is not separated. The above-configured switching panel facilitates a switching between 2D and 3D, thereby enabling a user to advantageously appreciate a 3D stereoscopic image without wearing polarizing glasses or active-shutter type glasses.

FIG. 5 shows that the parallax barrier works in one axial direction for example, by which the present invention may be non-limited. Alternatively, the present invention may adopt a parallax barrier capable of working in at least two axial directions in accordance with a control signal generated by the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, assume that a mobile terminal according to one embodiment of the present invention is able to provide a user with a 3D stereoscopic image via the display unit 151 by one of the above described methods.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

Checking 3D Depth of 3D Content

According to one embodiment of the present invention, a mobile terminal and controlling method for checking a 3D depth of each object included in a 3D content in various ways are provided. In this case, the 3D content means a content including a source image capable of providing a 3D stereoscopic image on being outputted via a display unit having a binocular disparity generating means and may conceptionally include both a still image and a video. In particular, in case that a 3D content includes a still image, it may include a single source image having a pair of left and right eye images. In case that a 3D content includes a video, it may include source images amounting to the number of frames.

To this end, a mobile terminal operating process is described with reference to FIG. 6 as follows.

Figure 6:
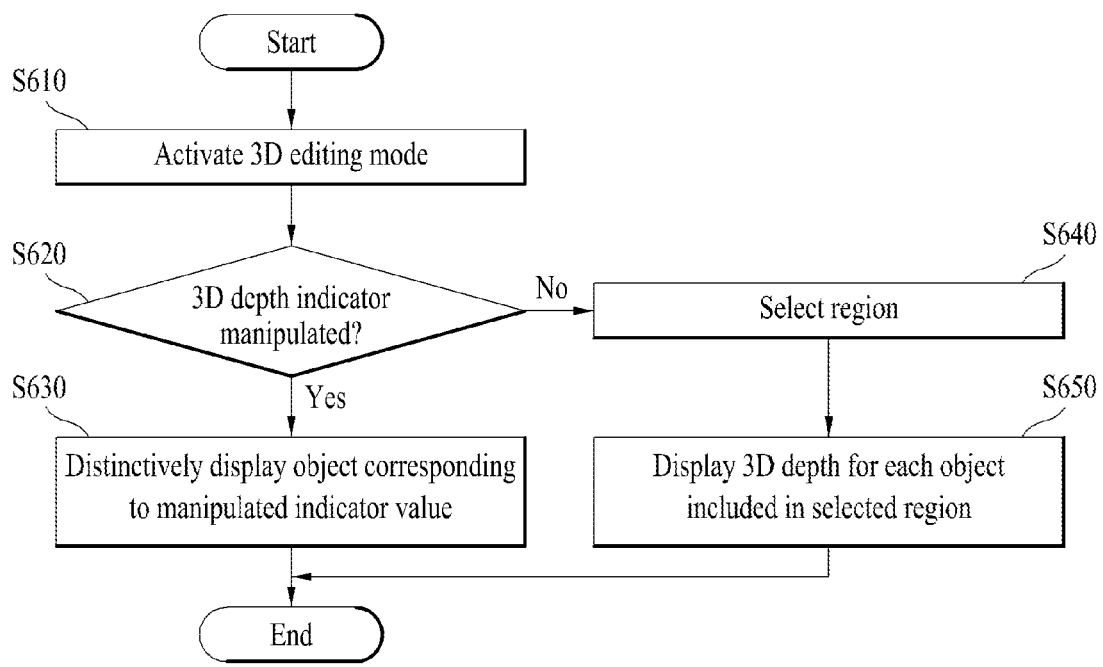
FIG. 6 is a flowchart for one example of a mobile terminal operating process for checking a 3D depth of each object included in a 3D content according to one embodiment of the present invention.

FIG. 6 is a flowchart for one example of a mobile terminal operating process for checking a 3D depth of each object included in a 3D content according to one embodiment of the present invention.

Referring to FIG. 6, a 3D content editing mode may be activated [S610]. The 3D content editing mode of the present invention may be implemented as one of components included in an application dedicated to the 3D content editing mode, a player application for playing 3D contents or a browser application for searching 3D content files. For instance, the 3D content editing mode may be activated if the dedicated application for the 3D content editing mode is activated. For another instance, the 3D content editing mode may be activated if a command for executing the 3D content editing mode is inputted in the course of activating an application for the 3D content editing mode or the like.

In the 3D content editing mode, a 3D depth indicator is provided to indicate a 3D depth of at least one object included in a source image of a 3D content specified as an editing target. If a value of the 3D depth indicator is determined or modified in response to an input of a user's command [S620], the controller 180 can display a prescribed visual effect to facilitate an object corresponding to the determined/modified indicator value to be checked by a user (i.e., at least one object corresponding to manipulated indicator value can be distinctively displayed) [S630]. In this case, the prescribed visual effect may be implemented by giving such a visual effect as color, highlight, outline and the like to an object matched to a currently set indicator value or giving such a visual effect as transparentization, dimming and the like to the rest of objects except the object corresponding to a currently set indicator value, or using both of the visual effects simultaneously.

As the 3D content editing mode is activated, when a source image is displayed on the touchscreen, if at least one partial region of the source image is specified by a touch input or the like [S640], the 3D depth of each object included in the specified partial region can be represented [S650].

In the following description, a method for the controller to determine a 3D depth for the present embodiment is explained.

First of all, according to a $1^{st}$ method of determining a 3D depth, the controller 180 may be able to set a 3D depth of an object, which has no binocular disparity by being situated at the same position in each of right and left eye images of a specific source image included in a 3D content, to a reference depth (e.g., 0). Thereafter, the controller 180 may be able to set 3D depths of the rest of objects in the corresponding source image in a manner of categorizing the corresponding 3D depths into a plurality of steps in accordance with binocular disparity. In doing so, in order to search each of the right and right eye images of the source image for the same object, it may be able to apply various kinds of image processing algorithms including a block search algorithms, an object tracking algorithm and the like.

Secondly, according to a $2^{nd}$ method of determining a 3D depth, in case that information on a 3D depth of each object included in a 3D content is included in advance as well as a source image, the controller 180 may be able to determine the 3D depth of the corresponding object by referring to the included information.

The above-described two methods are exemplary, by which the present invention may be non-limited. And, it is apparent to those skilled in the art that various kinds of methods for determining a 3D depth given to each object included in a source image are applicable.

In the following description, a process for activating a 3D content editing mode is explained with reference to FIG. 7.

Figure 7:
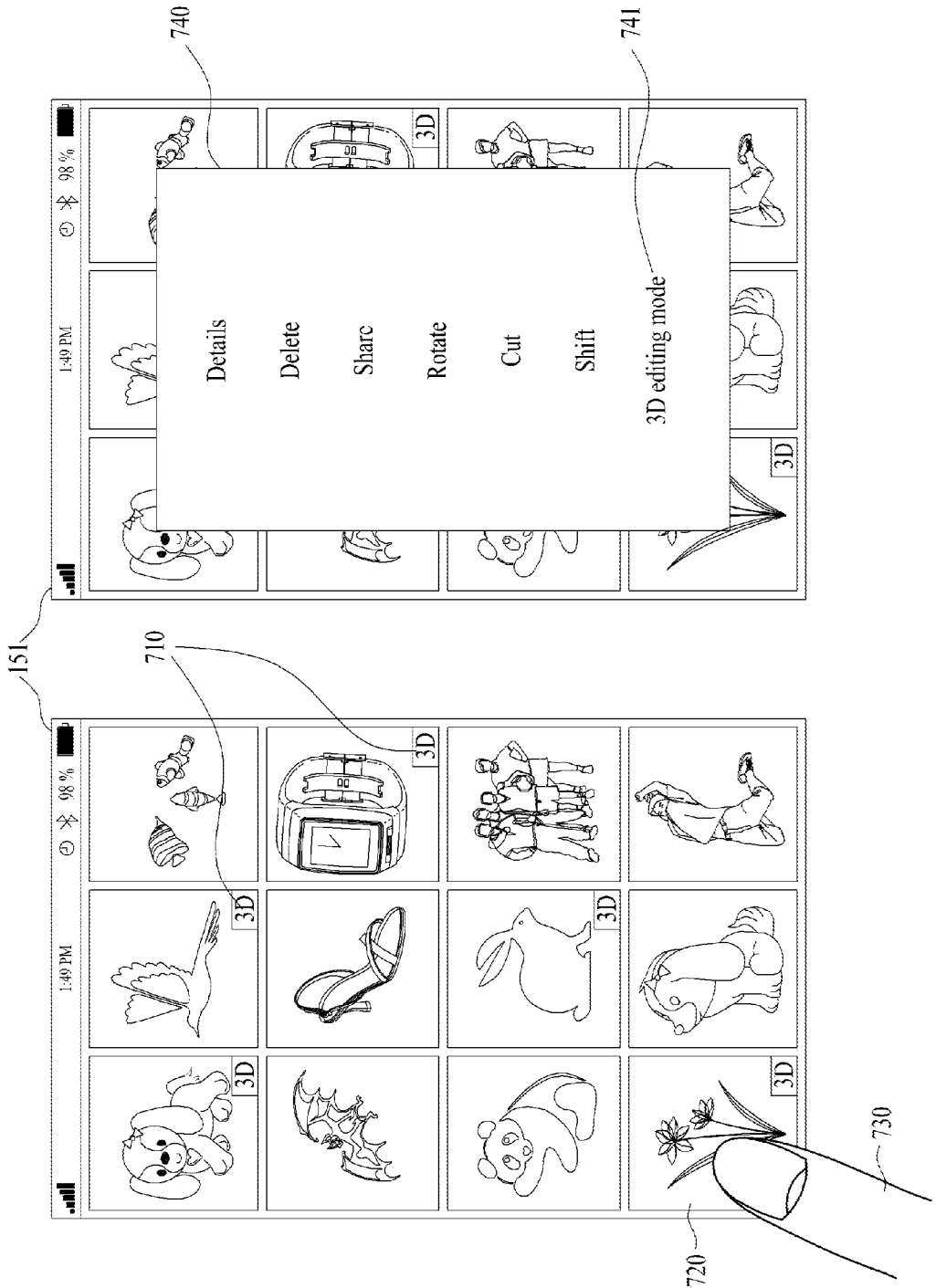
FIG. 7 is a diagram for one example of a process for activating a 3D content editing mode in a mobile terminal according to one embodiment of the present invention.

FIG. 7 is a diagram for one example of a process for activating a 3D content editing mode in a mobile terminal according to one embodiment of the present invention.

Referring to FIG. 7 (*a*), a multimedia content browser application for playing/checking both 2D and 3D contents is displayed on the touchscreen 151. In doing so, thumbnails of each content are enumerated on the touchscreen 151 in accordance with a prescribed reference. And, an indicator 710 is marked on each of the thumbnails respectively corresponding to 3D contents to indicate the corresponding content is the 3D content. In this case, the 3D contents respectively corresponding to the thumbnails may be saved in the memory 160 or such an external storage device as a web server connected via the wireless communication unit 110.

In particular, if a user touches a thumbnail 720 matched to a specific 3D content with a pointer 730, the corresponding content may be displayed as a full screen. If the user performs a long touch, referring to FIG. 7 (*b*), a popup window 740 containing additional menus, which can be performed on the corresponding content, may be displayed. In this case, if the user selects a 3D editing mode menu 741, a 3D content editing menu of the present embodiment can be activated.

According to the description with reference to FIG. 7, it is assumed that a 3D content editing mode is implemented as one function of an application capable of providing various functions. If the application is provided to perform the 3D content editing mode only, a thumbnail of an editable 3D content may be displayed only [FIG. 7 (*a*)]. If the thumbnail is selected by a simple touch input, the present mode may be activated.

Figure 8:
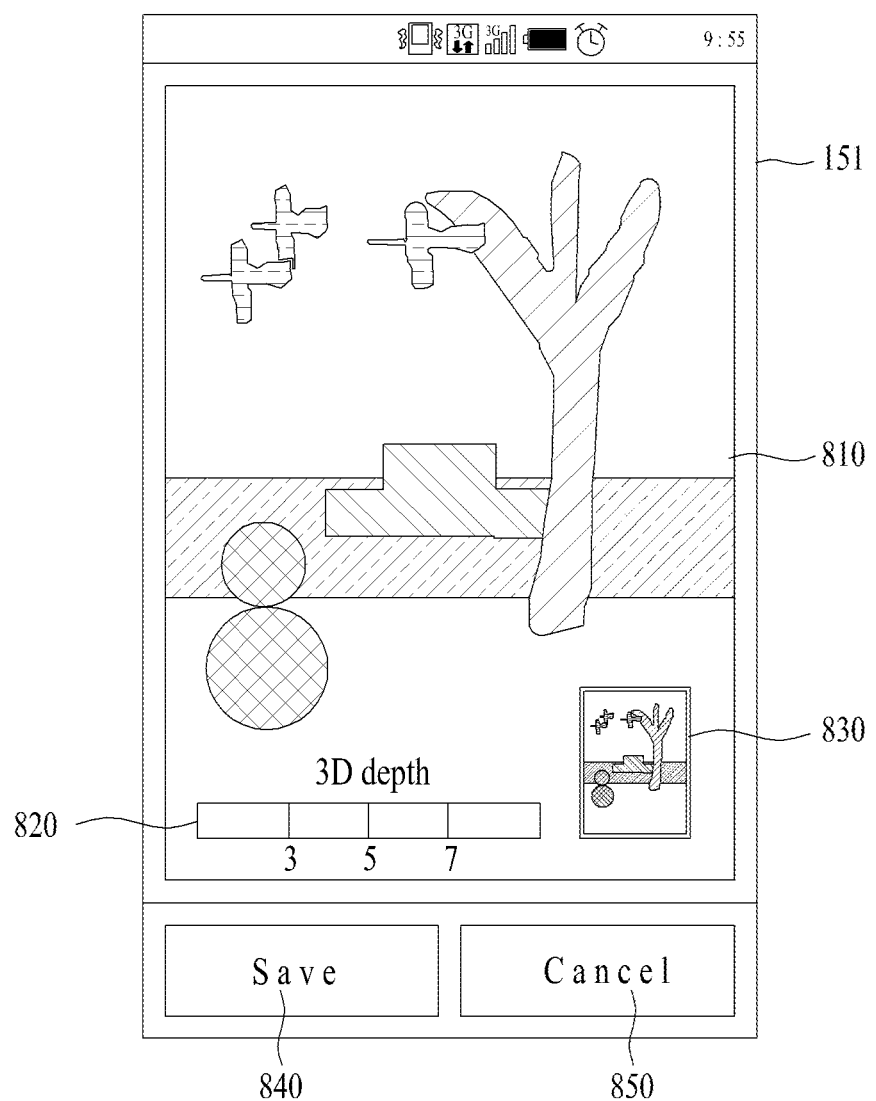
FIG. 8 is a diagram of display screen configuration for one example of a user interface configuration in a 3D content editing mode according to one embodiment of the present invention.

In the following description, a user interface in a 3D content editing mode is explained with reference to FIG. 8. FIG. 8 is a diagram of display screen configuration for one example of a user interface configuration in a 3D content editing mode according to one embodiment of the present invention.

In the following drawings including FIG. 8, assume that each object included in a 3D content exists independently in each of right and left eye images. For instance, when a $1^{st}$ object and a $2^{nd}$ object exists in a specific 3D content, although the $1^{st}$ object is arranged to block a prescribed portion of the $2^{nd}$ object, if one of the $1^{st}$ and $2^{nd}$ objects is shifted in parallel not to overlap with the other, assume that a blocked portion of the $2^{nd}$ object can be displayed. In particular, even if a prescribed region of a specific object is blocked by another object, image data of the blocked portion of the specific object can be preserved instead of disappearing. This makes the following difference. First of all, when a picture is taken in a general manner, if one object is photographed by blocking the other object, it may be unable to reconstruct the blocked portion of the other object from a corresponding photo file.

Referring to FIG. 8, if a 3D content editing mode is activated, an image of an editing target content is displayed on a primary region 810 of the touchscreen 151 and a 3D depth indicator 820 is displayed as a bar on a left bottom end of the primary region 810. In this case, the image of the editing target content displayed on the primary region 810 may include a 2D image or a 3D image. In case that the corresponding image includes the 2D image, the controller 180 may be able to control either a left eye image or a right eye image of the corresponding content to be displayed as a 2D image of the editing target content. Moreover, assume that a 3D depth can be categorized into level 1 to level 9. If the 3D depth approaches closer to the level 1, it is assumed as indicating the 3D depth viewed as if located closer to a user (i.e., projected toward the user).

Meanwhile, a thumbnail 830 of the corresponding content is displayed on a right bottom end of the primary region 810. And, a save menu 840 for saving an edited 3D content and a cancel menu 850 for ending/cancelling a present mode are arranged on a bottom end of the touchscreen 151.

The above-described configuration of the user interface is just exemplary. For instance, the user interface may include components more or less. In the present specification, the following description shall be made with reference to FIG. 8 on the assumption that a 3D content editing mode of the present invention is activated. Moreover, assume that an image of an editing target content displayed on a primary region is displayed in 2D mode.

In the following description, methods for checking a 3D depth given to an object according to the present embodiment are described with reference to FIGS. 9 to 12.

Figure 9:
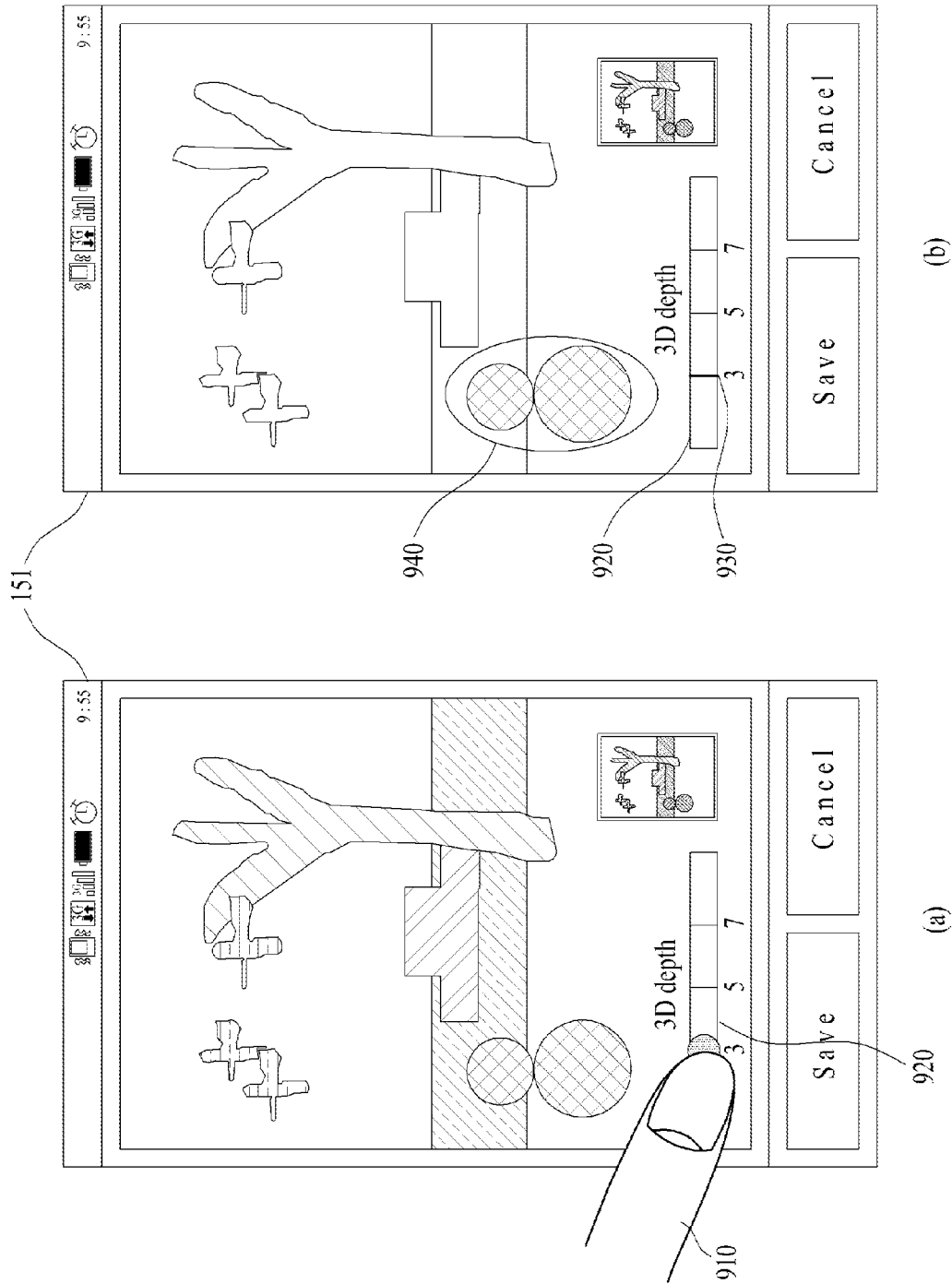
FIG. 9 is a diagram of display screen configuration for displaying an object in response to 3D depth specification according to one embodiment of the present invention.

FIG. 9 is a diagram of display screen configuration for displaying an object in response to 3D depth specification according to one embodiment of the present invention.

Referring to FIG. 9, a user touches a part corresponding to '3' of a 3D depth indicator 920 with a pointer 910 [FIG. 9 (*a*)]. In response to the touch, a selection visual effect 930 is displayed to announce that the part corresponding to '3' of the 3D depth indicator 920 is selected is displayed and a dimming effect is given to a region of a 3D content displayed on a primary region except an object 940 having a 3D depth '3' given thereto [FIG. 9 (b)]. Hence, the user is able to conveniently check an object having a specific 3D depth in an editing target 3D content.

Meanwhile, the user is able to consecutively change an indicator value by dragging the selection visual effect displayed on the 3D depth indicator and the controller is able to change and output a visual effect corresponding to the changed indicator value.

Figure 10:
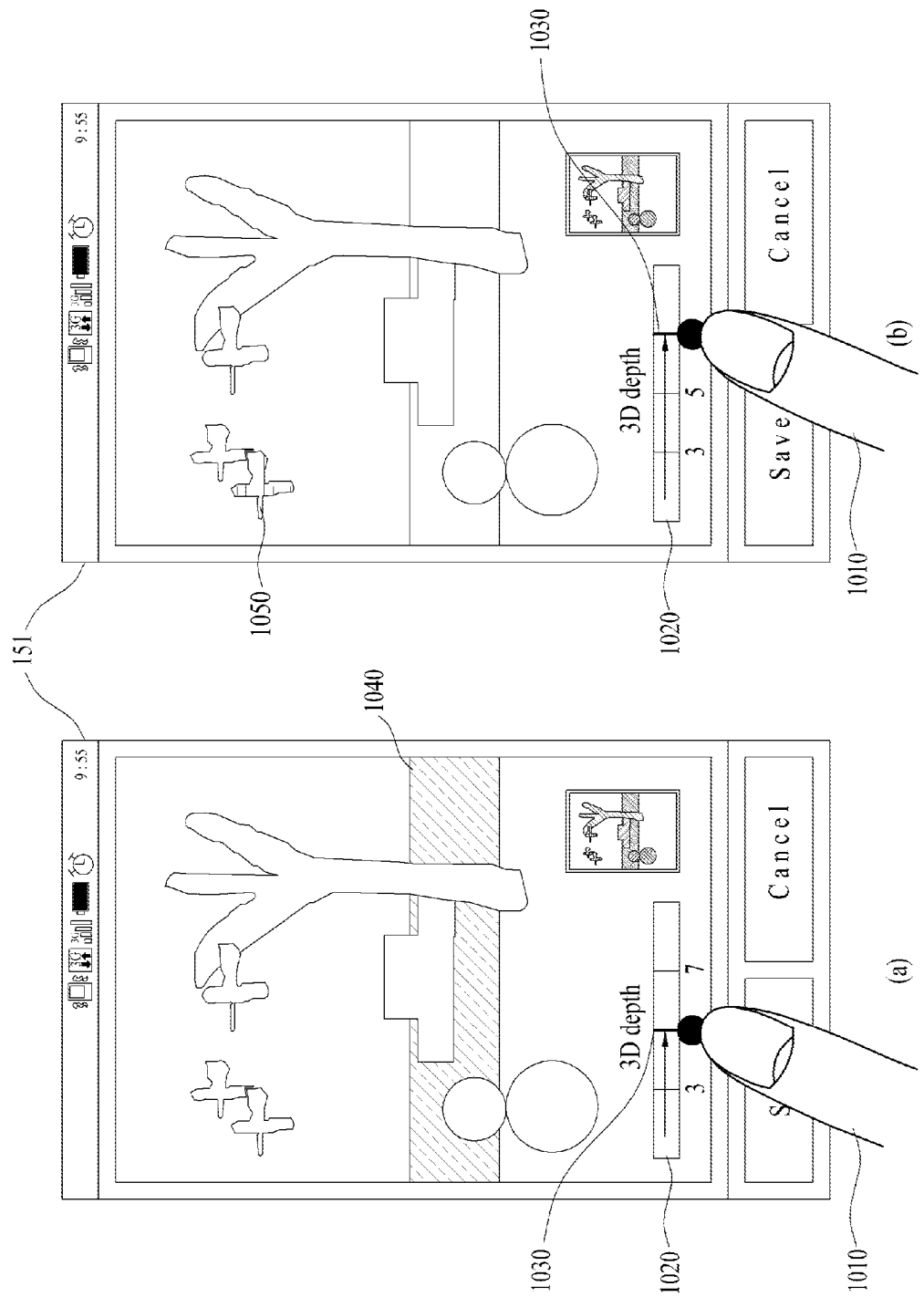
FIG. 10 is a diagram of display screen configuration for displaying an object in response to a 3D depth change according to one embodiment of the present invention.

FIG. 10 is a diagram of display screen configuration for displaying an object in response to a 3D depth change according to one embodiment of the present invention. In the following description, a process subsequent to the former process shown in FIG. 9 is explained for example.

Referring to FIG. 10 (a), the user is able to touch & drag the selection visual effect 1030 situated at '3' of the 3D indicator 1020 with the pointer 1010. In doing so, if the selection visual effect 1030 is situated at '5' of the 3D indicator 1020 in response to the input of the user's touch & drag, a dimming effect may be given to the rest of the part except an object 1040 corresponding to a 3D depth '5' among objects displayed on the primary region.

Referring to FIG. 10 (b), if the selection visual effect 1030 is situated at '7' of the 3D indicator 1020 in response to the input of the user's touch & drag, a dimming effect may be given to the rest of the part except an object 1050 corresponding to a 3D depth '7' among objects displayed on the primary region.

Meanwhile, if a specific region of the image of the 3D content displayed on the primary region is specified, a 3D depth of each of the objects included in the specified region may be displayed. This is described with reference to FIG. 11 as follows.

Figure 11:
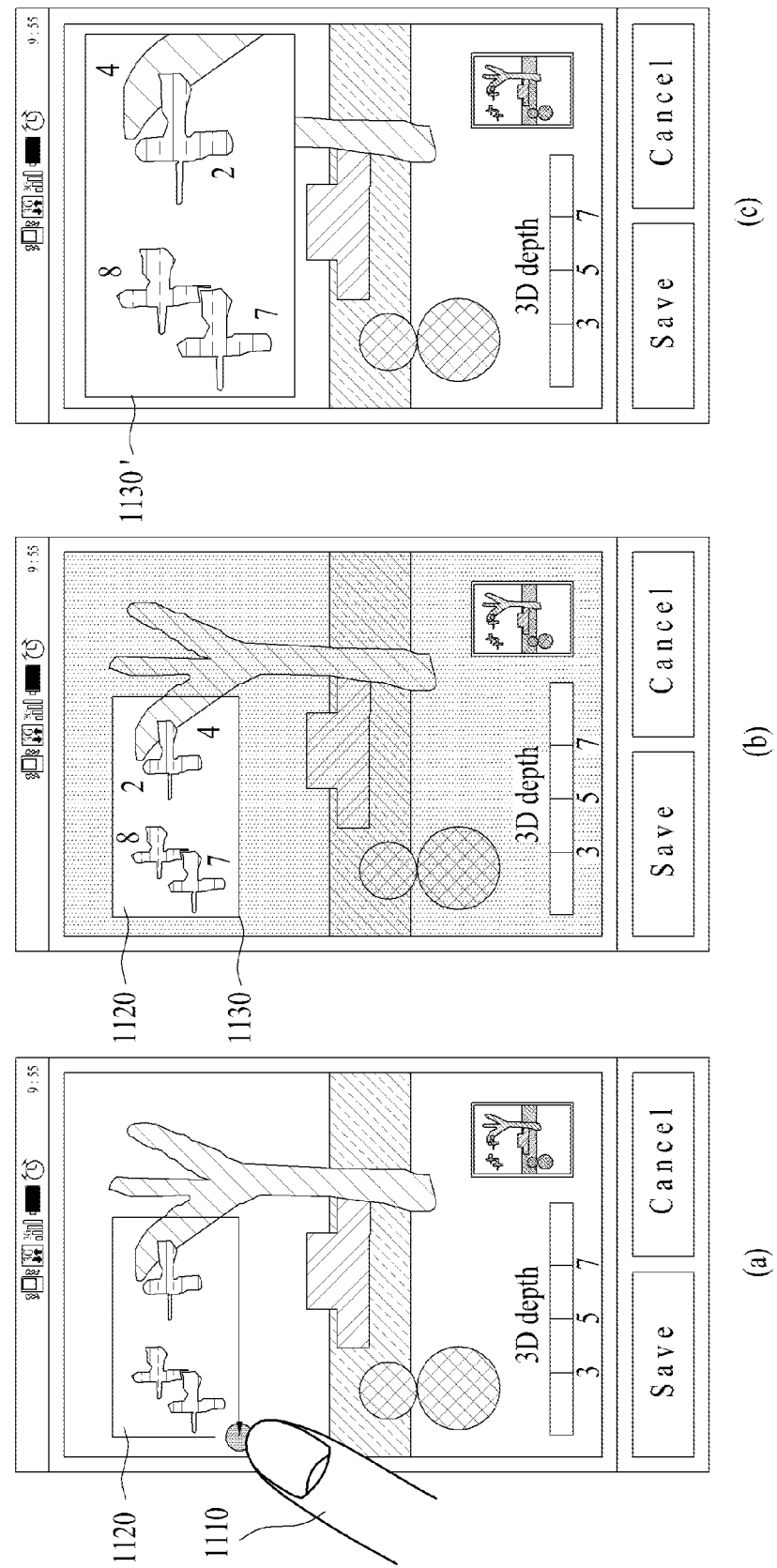
FIG. 11 is a diagram of display screen configuration for one example of representing a 3D depth of an object existing in a selected region according to one embodiment of the present invention.

FIG. 11 is a diagram of display screen configuration for one example of representing a 3D depth of an object existing in a selected region according to one embodiment of the present invention.

Referring to FIG. 11 (a), a user is able to select a region 1120, in which objects exist, from an image of a 3D content displayed on a primary region to check 3D depths of the objects by inputting a touch & drag with a pointer 1110. If a currently touched point of the touch & drag input meets a start point of the touch & drag, the controller 180 may be able to recognize that an inside region of a closed curve, which is created by a trace of the touch & drag input sensed until the start point is met, is the region selected by the user.

In response to the recognition, referring to FIG. 11 (b), an outline effect 1130 appears around the selected region 1120 and a numeral, which indicates a 3D depth of each of the objects inside the region 1120, can be displayed for the corresponding object. Moreover, a dimming effect may be given to the rest of the primary region except the selected region 1120. Alternatively, referring to FIG. 11 (c), instead of giving the dimming effect to the rest of the primary region, the region enclosed by an outline 1130' may be enlarged with a prescribed magnifying power.

Meanwhile, according to another example of the present embodiment, 3D depths respectively given to objects included in an editing target content can be checked at a time. For clarity, a mode for performing this function shall be named a collective check mode. This is described with reference to FIG. 12 as follows.

Figure 12:
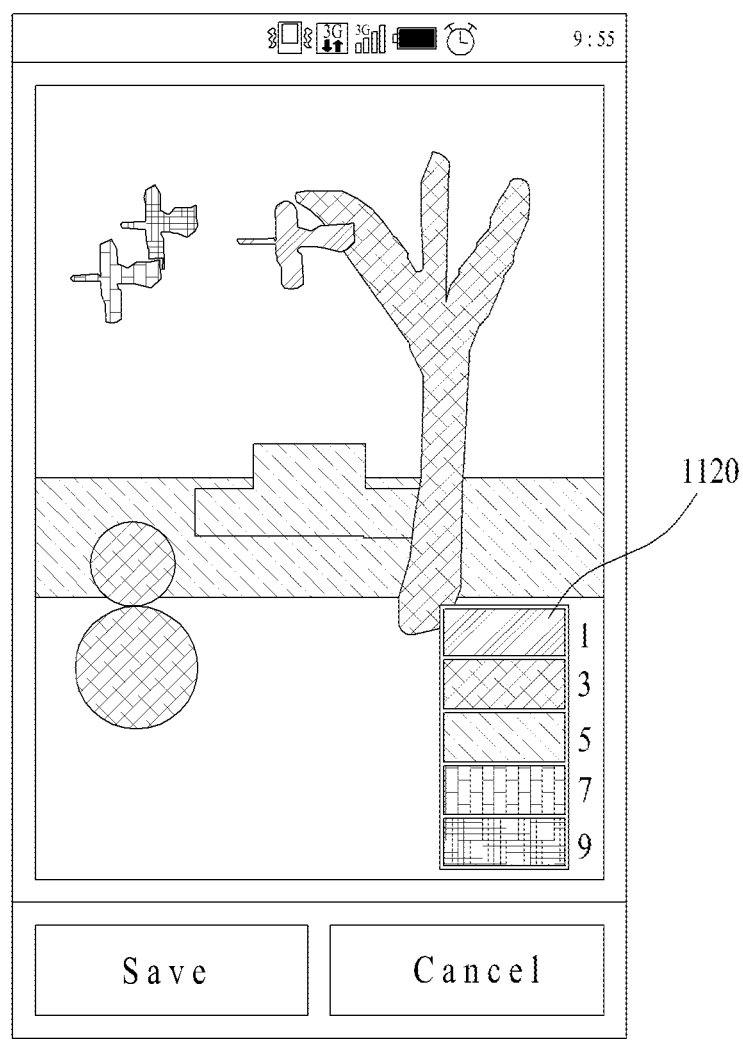
FIG. 12 is a diagram of display screen configuration for one example of a method of checking 3D depths given to objects existing in an editing target content in 3D content editing mode at a time according to one embodiment of the present invention.

FIG. 12 is a diagram of display screen configuration for one example of a method of checking 3D depths given to objects existing in an editing target content in 3D content editing mode at a time according to one embodiment of the present invention.

Referring to FIG. 12, if a user selects a collective check mode, a 3D indicator and thumbnails previously displayed on a primary region of the touchscreen disappear from the primary region and a color indicator bar 1210 is then displayed on the primary region. Colors respectively corresponding to a plurality of 3D depths are displayed on the color indicator bar 1210. And, the color corresponding to the 3D depth, which is given to each of the objects included in an image of an editing target 3D content displayed on the primary region, is displayed to correspond to the color indicator bar 1210. Hence, the objects having the same color given thereto may be regarded as having the same depth. If the user inquires the corresponding color on the color indicator bar 1210, the user is able to know the 3D depth matched to the corresponding color. The present mode may be selected by a prescribed menu manipulation or a prescribed hardware key button manipulation. Alternatively, the present mode may be selected if a long touch input is applied to a 3D indicator displayed on a primary region in a 3D content editing mode.

In the following description, a method of changing at least one of a 3D depth and a size of an object according to the present embodiment is explained with reference to FIG. 13.

Figure 13:
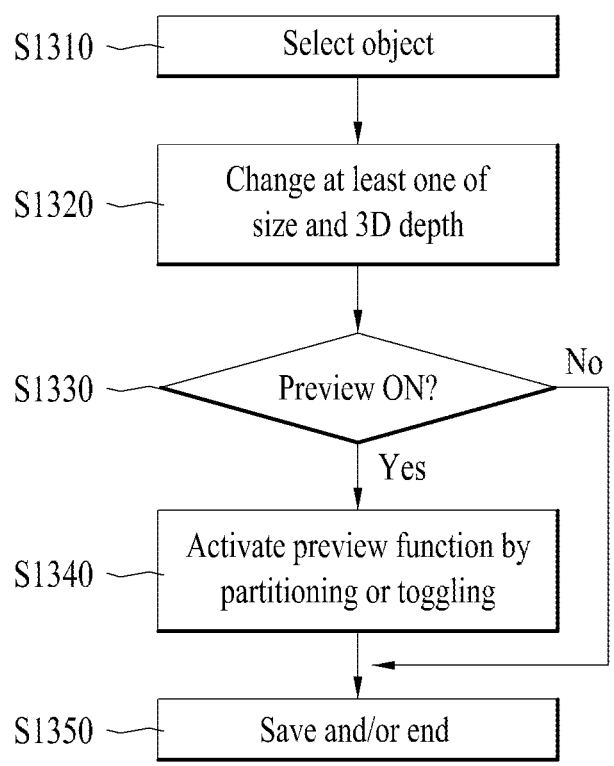
FIG. 13 is a flowchart for one example of a mobile terminal operating process for changing at least one of a 3D depth and a size of a specific object included in a 3D content and then checking a corresponding effect in various ways according to one embodiment of the present invention.

FIG. 13 is a flowchart for one example of a mobile terminal operating process for changing at least one of a 3D depth and a size of a specific object included in a 3D content and then checking a corresponding effect in various ways according to one embodiment of the present invention.

First of all, assume that FIG. 13 shows a process after the aforementioned 3D content editing mode has been activated. For instance, FIG. 13 may show a process executed after the step S610 shown in FIG. 6, and more particularly, a process subsequent to the step S630 or the step S650 shown in FIG. 6.

Referring to FIG. 13, a specific object may be selected from an editing target 3D content [S1310]. In particular, the selection of the object may be performed in a manner of applying a touch input to the image of the editing target 3D content displayed on the primary region mentioned in the foregoing description, the thumbnail displayed on the primary region mentioned in the foregoing description, or a point corresponding to the specific object on the selected region 1120 previously described with reference to FIG. 11. In doing so, as the specific object is selected, a selection visual effect may be displayed at the point corresponding to the 3D depth of the selected object on the 3D indicator displayed on the primary region.

Subsequently, the user may be able to change the 3D depth given to the selected object in a manner of changing a size of the selected object by a touch input or manipulating the 3D indicator [S1320]. In doing so, if one of the 3D depth and the size is changed, the other may be changed correspondingly in accordance with a prescribed correlation in-between.

If the size and/or the 3D depth of the selected object is changed, a preview function for the comparison with an original content may be selected [S1330].

If the preview function is selected, the controller may control an original image and a changed image as 3D stereoscopic images sequentially by activating the binocular disparity creating means of the touchscreen [Toggling]. Alternatively, if the preview function is selected, the controller partitions the primary region into two regions and may control the original image and the changed image to be displayed as 3D stereoscopic images simultaneously [Partitioning] [S1340].

Thereafter, in response to a selection made by the user, the 3D content having the object, of which 3D depth and/or size is changed, can be saved in the memory 160. And, it is a matter of course that the present mode can be ended without saving the corresponding 3D content.

In the following description, the object selecting step is explained in detail with reference to FIG. 14.

Figure 14:
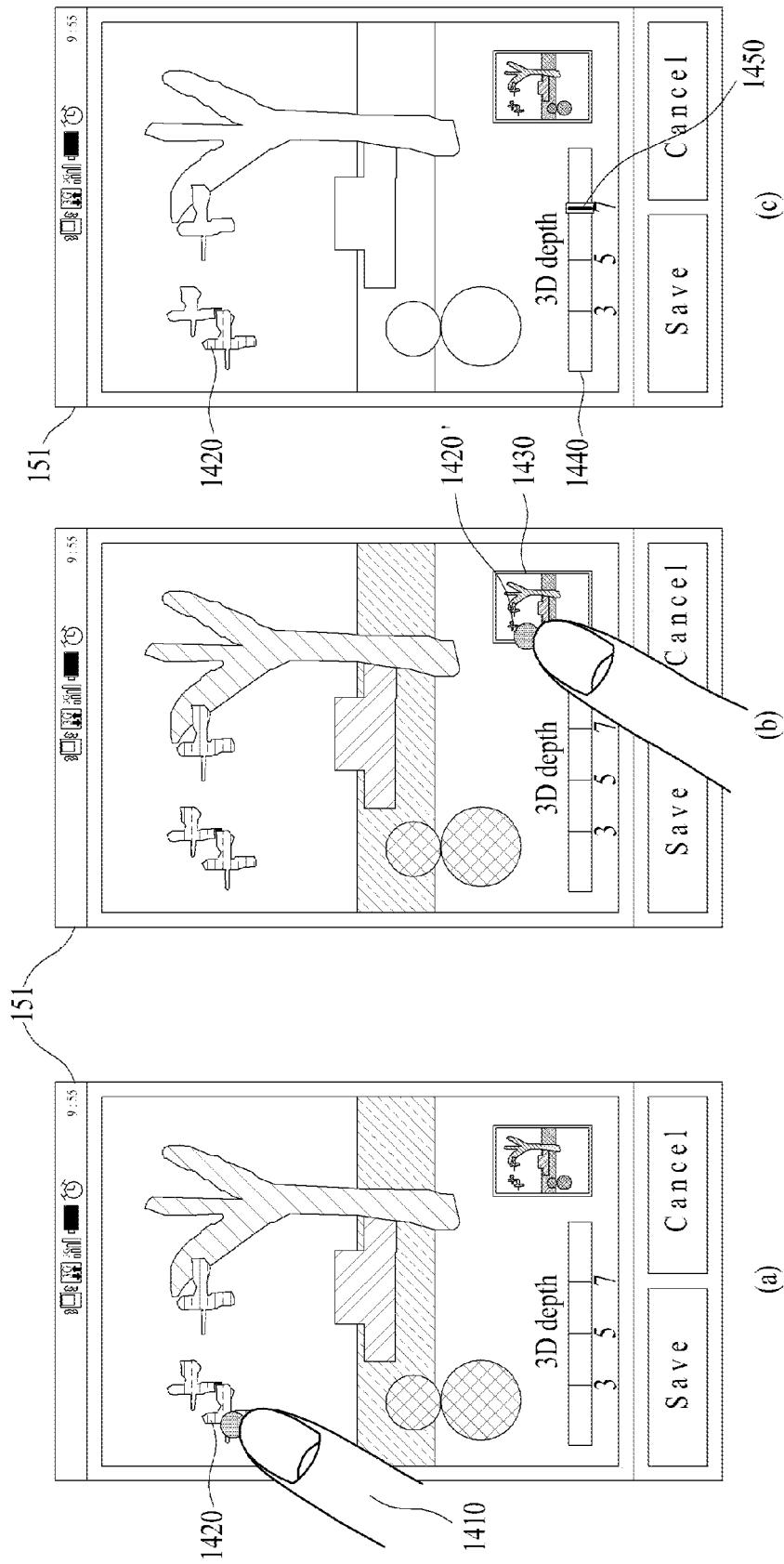
FIG. 14 is a diagram of display screen configuration for one example of a process for selecting a specific object in a 3D content editing mode according to one embodiment of the present invention.

FIG. 14 is a diagram of display screen configuration for one example of a process for selecting a specific object in a 3D content editing mode according to one embodiment of the present invention.

Referring to FIG. 14, after a 3D content editing mode has been activated, an object may be selected in a manner that a user touches a specific object 1420 in an image of an editing target content displayed on a primary region with a pointer 1410 [FIG. 14 (*a*)] or that the user touches a point 1420' corresponding to the specific object 1420 on a thumbnail 1430 [FIG. 14 (*b*)]. If the object is selected, a dimming effect may be given to the remaining region of the image of the editing target content displayed on the primary region except the selected object 1420 [FIG. 14 (*c*)]. Moreover, a 3D depth indicator 1440 may have a selection visual effect 1450 given to a position corresponding to a 3D depth given to the selected object 1420.

In the following description, a process for editing a selected object is explained in detail with reference to FIG. 15.

Figure 15:
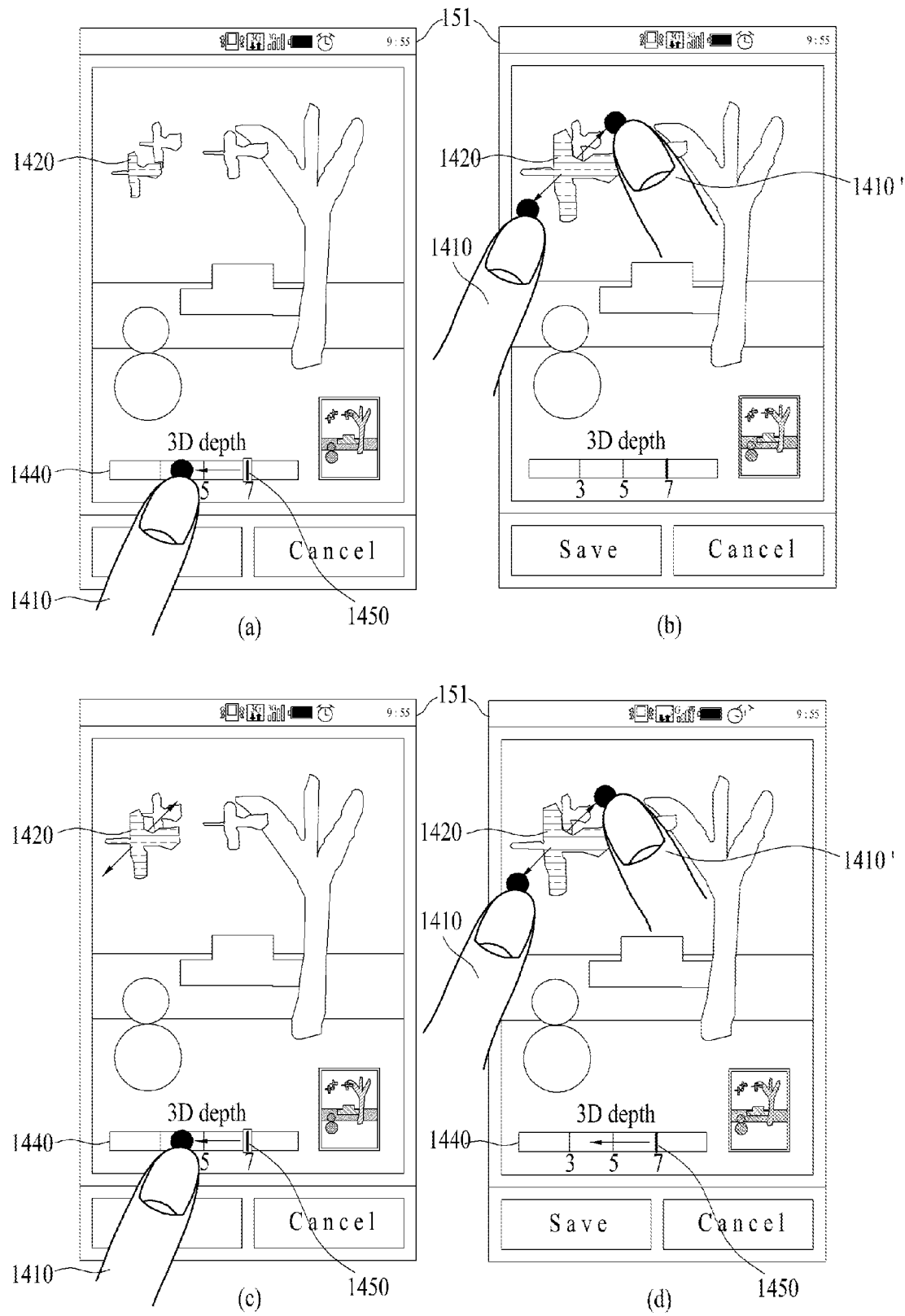
FIG. 15 is a diagram of display screen configuration for one example of a process for changing a 3D depth and size of an object selected in a 3D content editing mode according to one embodiment of the present invention.

FIG. 15 is a diagram of display screen configuration for one example of a process for changing a 3D depth and size of an object selected in a 3D content editing mode according to one embodiment of the present invention. In particular, FIG. 15 shows a process subsequent to the former process shown in FIG. 14. In more particular, assume that the selection of the object has been completed.

Referring to FIG. 15, in case that a user intends to change the 3D depth of the selected object 1420, the selection visual effect 1450 of the 3D indicator 1440 can be dragged to a point corresponding to a desired 3D depth using the pointer 1410 [FIG. 15 (*a*)].

If the user intends to increase a size of the selected object 1420, referring to FIG. 15 (*b*), the user touches the selected object 1420 with two pointers 1410 and 1410' simultaneously, drags the two pointers 1410 and 1410' to become more distant from each other, and then cancels the touches with the two pointers. In doing so, an increasing extent may be proportional to a distance of the drag. Moreover, in case of attempting to decrease the size of the selected object 1420, the user may be able to drag the two pointers to get closer to each other.

Meanwhile, in FIG. 15 (*a*) and FIG. 15 (*b*), either the 3D depth or the size is changed at a time. Optionally, the two properties (i.e., the 3D depth and the size) may be linked to each other. The linkage between the 3D depth and the size may be attributed to the natural phenomenon that a closer object looks big or that a distant object looks small. For instance, referring to FIG. 15 (*c*), if the user changes the 3D depth of the selected object 1420 in direction for enabling the selected object 1420 to look more projected, the controller 180 may be able to control the corresponding object to be enlarged in proportion to the variation of the 3D depth. For another instance, referring to FIG. 15 (*d*), if the user increases the size of the selected object, the controller 180 may be able to change the 3D depth of the corresponding object in direction for enabling the corresponding object to look projected in proportion to the increasing extent.

In the following description, a preview function executable after editing an object is explained with reference to FIG. 16.

Figure 16:
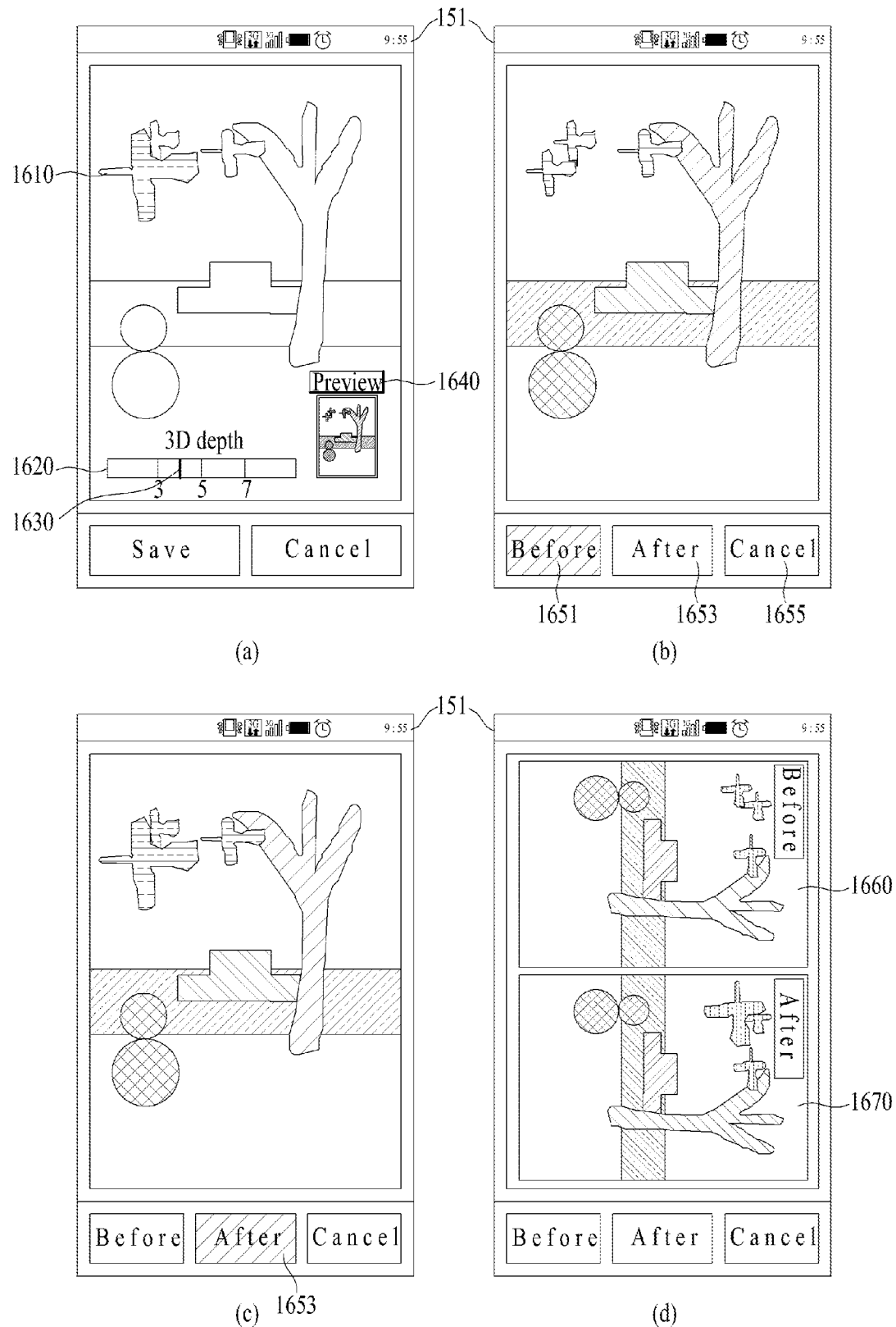
FIG. 16 is a diagram of display screen configuration for one example of activating a preview function in a 3D content editing mode according to one embodiment of the present invention.

FIG. 16 is a diagram of display screen configuration for one example of activating a preview function in a 3D content editing mode according to one embodiment of the present invention.

Referring to FIG. 16, if a 3D depth and/or size of an object 1610 is changed by one of the methods described with reference to FIG. 15, the controller 180 may control a preview icon 1640 to be displayed on the touchscreen 151 [FIG. 16 (*a*)]. If a user touches the preview icon 1640, referring to FIG. 16 (*b*), an original image can be displayed as a 3D stereoscopic image on a primary region and an original menu 1651 is highlighted on a bottom end of the touchscreen 151 to indicate that the original image is currently displayed. In doing so, if an edited image menu 1653 is selected, referring to FIG. 16 (*c*), the corresponding menu is highlighted. And, a final image edited through the editing mode may be displayed on the primary region. Meanwhile, if a cancel menu 1655 is selected, the preview function is ended and the screen shown in FIG. 16 (*a*) can be displayed again.

Of course, the order for initially displaying the original image or the edited image in case of activation of the present function may be changeable. Even if the corresponding menu is not selected, the original image and the edited image may be alternately displayed by predetermined time unit.

Instead of the method of displaying the original image and the edited image alternately by toggling, the preview function can be activated through screen partition, which is shown in FIG. 16 (*d*). For instance, the original image may be displayed on an upper part 1660 of a main screen and the edited image may be displayed on a lower part 1670 of the main screen.

Of course, the preview icon may be displayed while a 3D content is not edited. While the 3D content is not edited, if the preview icon is selected, an image of an editing target 3D content displayed in 2D may be displayed as a 3D stereoscopic image during prescribed time or until a next touch input.

In the following description, the principle of adjusting a specific 3D depth is explained with reference to FIG. 17.

Figure 17:
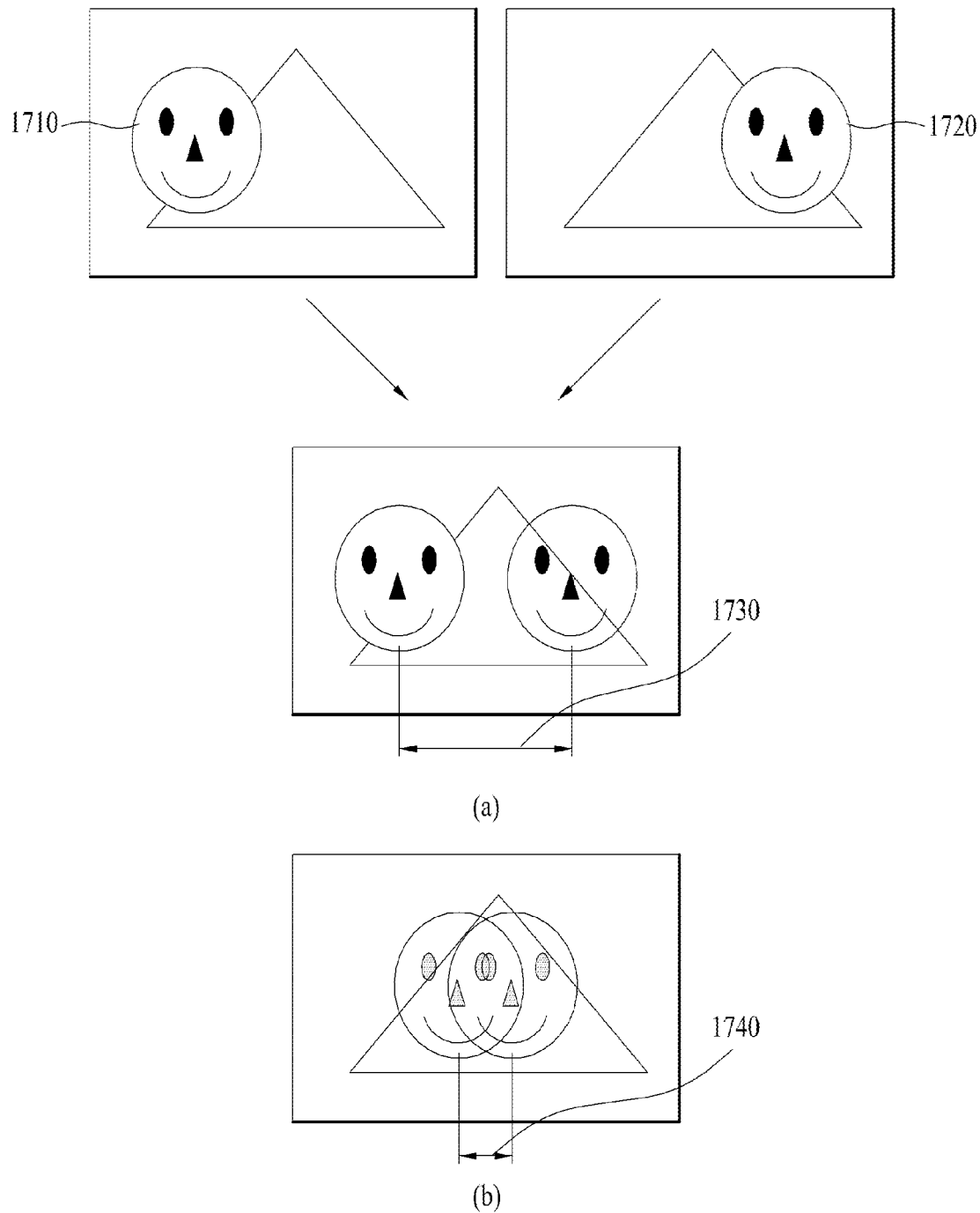
FIG. 17 is a schematic diagram of a process for editing a 3D depth according to one embodiment of the present invention.

FIG. 17 is a schematic diagram of a process for editing a 3D depth according to one embodiment of the present invention.

Referring to FIG. 17, a triangle at the center of each of a left eye image and a right eye image becomes a convergence object having a reference 3D depth given thereto. Owing to a position difference between a face FIG. 1710 situated at a left part of the left eye image and a face FIG. 1720 situated at a right part of the right eye image, a user is able to sense a 3D effect [FIG. 17 (*a*)]. Assume a case that a 3D depth of a face-figure object is adjusted in a 3D depth decreasing direction by the method mentioned in the foregoing description. If so, a distance 1730 between the face figures in the left and right images of a source image can decrease into a distance 1740 shown in FIG. 17 (*b*).

Meanwhile, the foregoing description has been made on the assumption that objects included in a 3D content exist independently. Yet, a content created like a 3D picture photographed via at least two cameras is vulnerable to loss if shifted in a manner of separating objects included in the created content from each other. In particular, if a position of a specific object is changed in a normal 3D picture, data for a background corresponding to an original position of the corresponding object may not exist. For instance, if a background is independently photographed and a man is then photographed together with the background, background data corresponding to an original position of the man can be brought from an original copy despite that a position of the man is shifted. Otherwise, it may cause a problem because the absence of data of the background corresponding to the original position of the man. Thus, a quality of the content may be degraded. As mentioned in the description with reference to FIG. 17, if a spaced distance between an object selected from a left eye image and an object selected from a right eye image is adjusted in a 3D content editing mode, it may be able to adjust a 3D depth of the corresponding object. Yet, it may cause the image loss problem in the course of adjusting the 3D depth.

To solve the above problem, a method according to another example of the present embodiment is described with reference to FIG. 18 as follows.

FIG. 18 is a diagram for one example of an image compensating method in various aspects according to one embodiment of the present invention.

First of all, assume the object arrangement shown in FIG. 17.

Referring to FIG. 18 (*a*), if an object 1810 is shifted to a center by a 3D depth editing method according to one embodiment of the present invention, a crescent-shaped space 1820, of which image information is lost, is generated from a region, which does not overlap with a region occupied by the shifted object, in an original left eye image used to be occupied by the object 1810.

Thus, if the image information lost space (hereinafter named a loss space) is displayed as it is, an image quality is degraded. Therefore, another example of the present embodiment proposes to perform compensation using image information corresponding to the loss space in an opposite image.

For instance, referring to FIG. 18 (*b*), the image information of the crescent-shaped space 1830 corresponding to the loss pace generated from the left eye image is brought from the right eye image and the loss pace of the left eye image can be covered with the brought image information. On the contrary, a loss space in the right image can be filled with image information of the left eye image corresponding to the loss space. Moreover, in case of a video, it may be able to use a method of brining image information of a loss space from a frame next or previous to a corresponding frame.

The aforementioned embodiments of the mobile terminal and controlling method thereof are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display comprising a binocular disparity element and configured to display three-dimensional (3D) content comprising a first image configured to be viewed by a left eye and including an object of a plurality of displayed objects and a second image configured to be viewed by a right eye and including the object, the object appearing differently in the first and second images to create an appearance of a 3D image of the object, wherein the object in the first image and the object in the second image each include a corresponding common point, and wherein a position of the common point in relation to the first image and a position of the common point in relation to the second image are separated by a distance based on a 3D depth of the object;
a touchpad configured to receive input from a user; and
a controller configured to:
cause the display to display the 3D content;
cause the display to display a plurality of numerals each corresponding to one of the plurality of displayed objects in a selected partial region of the displayed 3D content, each of the displayed plurality of numerals positioned adjacent to the corresponding object and indicating a 3D depth of the corresponding object, wherein the plurality of numerals are displayed in response to a first input received via the touchpad and the first input comprises a selection of the selected partial region;
select a specific object in response to a second input received via the touchpad, wherein the second input comprises a selection of the specific object positioned in the selected partial region; and
change a size of the specific object in each of the first and second images and change a position of the specific object in at least the first image or the second image in response to a third input received via the touchpad such that the size of the specific object and the distance between the common point in the first image and the common point in the second image are changed, wherein the third input is for changing the 3D depth or size of the object, and the size of the specific object is linked to the 3D depth of the specific object.

2. The mobile terminal of claim 1, wherein the controller is further configured to:
activate a preview function in response to the third input; and
cause the display to simultaneously display an original image of the 3D content and an edited image of the 3D content while the preview function is activated.

3. The mobile terminal of claim 2, wherein each of the original image and the edited image is displayed as a 3D stereoscopic image.

4. The mobile terminal of claim 1, wherein the controller is further configured to:
cause the display to display an icon in response to the third input, wherein the icon is configured to receive input for activating a preview function; and
activate the preview function in response to a fourth input received at the icon via the touchpad.

5. The mobile terminal of claim 4, wherein the controller is further configured to cause the display to switch between displaying an original image of the 3D content and an edited image of the 3D content in response to an input received via the touchpad while the preview function is activated.

6. The mobile terminal of claim 1, wherein the controller is further configured to cause the display to display the 3D content excluding the specific object using a prescribed visual effect in response to the second input.

7. The mobile terminal of claim 6, wherein the prescribed visual effect comprises a dimming effect.

8. The mobile terminal of claim 1, wherein the controller is further configured to cause the display to display:
a corresponding 3D depth indicator adjacent to each of the plurality of displayed objects in response to the first input; and one or more of the plurality of displayed objects with a prescribed visual effect in response to a selection of a specific 3D depth via the 3D depth indicator;

wherein each of the one or more of the plurality of displayed objects has a 3D depth matching the specific 3D depth.

9. The mobile terminal of claim 1, further comprising a touchscreen including the display and the touchpad.

10. The mobile terminal of claim 1, wherein:
changing the position or the size of the specific object in the first image results in a loss space at a portion of the first image no longer occupied by the specific object; and
the controller is further configured to:
extract a partial image corresponding to the loss space from the second image; and
insert the partial image into the loss space of the first image.

11. A method of controlling a mobile terminal, the method comprising:
displaying three-dimensional (3D) content on a display of the mobile terminal comprising a binocular disparity element, wherein the 3D content comprises a first image configured to be viewed by a left eye and including an object of a plurality of displayed objects and a second image configured to be viewed by a right eye and including the object, the object appearing differently in the first and second images to create an appearance of a 3D image of the object, wherein the object in the first image and the object in the second image each include a corresponding common point, and wherein a position of the common point in relation to the first image and a position of the common point in relation to the second image are separated by a distance based on a 3D depth of the object;
displaying a plurality of numerals each corresponding to one of the plurality of displayed objects in a selected partial region of the displayed 3D content, each of the displayed plurality of numerals positioned adjacent to the corresponding object and indicating a 3D depth of the corresponding object, wherein the plurality of numerals are displayed in response to a first input received via the touchpad and the first input comprises a selection of the selected partial region;
selecting a specific object in response to a second input received via the touchpad, wherein the second input comprises a selection of the specific object positioned in the selected partial region; and
changing a size of the specific object in each of the first and second images and changing a position of the specific object in at least the first image or the third image in response to a third input such that the size of the specific object and the distance between the common point in the first image and the common point in the second image are changed, wherein the third input is for changing the 3D depth or size of the specific object, and the size of the specific object is linked to the 3D depth of the specific object.

12. The method of claim 11, further comprising displaying the 3D content excluding the specific object using a prescribed visual effect in response to the second input.

13. The method of claim 11, further comprising:
displaying a 3D depth indicator adjacent to each of the plurality of displayed objects in response to the first input; and
displaying one or more of the plurality of displayed objects with a prescribed visual effect in response to a selection of a specific 3D depth via the 3D depth indicator;
wherein each of the one or more of the plurality of displayed objects has a 3D depth matching the specific 3D depth.

14. The method of claim 11, further comprising:
activating a preview function in response to the third input; and
simultaneously displaying an original image of the 3D content and an edited image of the 3D content while the preview function is activated.

15. The method of claim 14, wherein each of the original image and the edited image is displayed as a 3D stereoscopic image.

16. The method of claim 11, further comprising:
displaying an icon in response to the third input, wherein the icon is configured to receive input for activating a preview function; and
activating the preview function in response to a fourth input received at the icon.

17. The method of claim 11, further comprising switching between displaying an original image of the 3D content and an edited image of the 3D content in response to an input received via the touchpad while the preview function is activated.

18. The method of claim 11, wherein changing the position of the size of the specific object in the first image results in a loss space at a portion of the first image no longer occupied by the specific object; and
the method further comprises extracting a partial image corresponding to the loss space from the second image and inserting the partial image into the loss space of the first image.

* * * * *